United States Patent
Ikeda et al.

(10) Patent No.: US 11,615,343 B2
(45) Date of Patent: Mar. 28, 2023

(54) ANOMALY DETECTION APPARATUS, ANOMALY DETECTION METHOD, AND PROGRAM

(71) Applicant: NIPPON TELEGRAPH AND TELEPHONE CORPORATION, Chiyoda-ku (JP)

(72) Inventors: Yasuhiro Ikeda, Musashino (JP); Keisuke Ishibashi, Musashino (JP); Yusuke Nakano, Musashino (JP); Keishiro Watanabe, Musashino (JP); Ryoichi Kawahara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 326 days.

(21) Appl. No.: 16/760,709

(22) PCT Filed: Oct. 26, 2018

(86) PCT No.: PCT/JP2018/039987
§ 371 (c)(1),
(2) Date: Apr. 30, 2020

(87) PCT Pub. No.: WO2019/087987
PCT Pub. Date: May 9, 2019

(65) Prior Publication Data
US 2020/0349470 A1    Nov. 5, 2020

(30) Foreign Application Priority Data
Nov. 2, 2017    (JP) .............................. JP2017-212801

(51) Int. Cl.
*G06N 20/00*    (2019.01)
*G06K 9/62*    (2022.01)
(Continued)

(52) U.S. Cl.
CPC ........... *G06N 20/00* (2019.01); *G06K 9/6215* (2013.01); *G06K 9/6256* (2013.01); *G06N 7/005* (2013.01); *G06V 10/82* (2022.01)

(58) Field of Classification Search
CPC ........ G06N 3/088; G06N 20/00; G06N 7/005; G06N 3/02; G06K 9/6215; G06K 9/6256; G06V 10/82
See application file for complete search history.

(56) References Cited

U.S. PATENT DOCUMENTS

| 11,334,407 B2 * | 5/2022 | Okanohara | ............... G06N 3/08 |
| 2017/0076224 A1 * | 3/2017 | Munawar | ............. G06N 3/0454 |

(Continued)

FOREIGN PATENT DOCUMENTS

| JP | 2005-237668 A | 9/2005 |
| WO | WO 2017/094267 A1 | 6/2017 |

OTHER PUBLICATIONS

Ikeda et al., "Inferring causal parameters of anomalies detected by autoencoder using sparse optimization," Institute of Electronics, information and Communication Engineers, IEICE Technical Report, IN 201 7-18 (201 7-06), vol. 117, No. 89, pp. 61-66, ISSN 0913-5685, Jun. 2017.*

(Continued)

*Primary Examiner* — Shaghayegh Azima
(74) *Attorney, Agent, or Firm* — Oblon, McClelland, Maier & Neustadt, L.L.P.

(57) ABSTRACT

An anomaly detection apparatus having a function of an autoencoder that includes an input layer, hidden layers, and an output layer, and that learns parameters such that data of the input layer is reproduced in the output layer, the anomaly detection apparatus including: input means that input normal data of a plurality of types; learning means that learn parameters such that normal data of the input layer is reproduced in the output layer by learning a feature across (Continued)

data types using data of a dimension which is smaller than a dimension of the normal data; and anomaly degree calculation means that input test data to the autoencoder using the parameters learned by the learning means, and calculate anomaly degree of the test data based on output data of the autoencoder and the test data.

7 Claims, 10 Drawing Sheets

(51) Int. Cl.
    *G06N 7/00*         (2023.01)
    *G06V 10/82*       (2022.01)

(56) References Cited

U.S. PATENT DOCUMENTS

| | | | |
|---|---|---|---|
| 2017/0220854 A1* | 8/2017 | Yang | G06K 9/6267 |
| 2017/0293736 A1* | 10/2017 | Kramer | G06N 3/0454 |
| 2020/0250475 A1* | 8/2020 | Ikeda | G06N 3/088 |
| 2021/0011791 A1* | 1/2021 | Okanohara | G06N 7/00 |
| 2022/0188700 A1* | 6/2022 | Khavronin | G06Q 30/0204 |

OTHER PUBLICATIONS

Sakurada et al., "Dimensionality Reduction with the Autoencoder for Anomaly Detection of Spacecrafts", Proceedings of the 28th Annual Conference of the Japanese Society for Artificial Intelligence, pp. 1-3, 2014 (with English translation) (total 10 pages).

Kimura et al., "Spatio-temporal Factorization of Log Data for Understanding Network Events", IEEE INFOCOM 2014—IEEE Conference on Computer Communications, pp. 610-618, 2014 (total 9 pages).

An et al., "Variational Autoencoder based Anomaly Detection using Reconstruction Probability", SNU Data Mining Center, 2015-2 Special Lecture on IE, Dec. 2015 (total 18 pages).

Zhang et al., "Start from Scratch: Towards Automatically Identifying, Modeling, and Naming Visual Attributes", ACM 978-1-4503-3063-3/14/11, pp. 187-196, Nov. 2014 (total 10 pages).

Notice of Reasons for Refusal dated Jan. 18, 2022 in Japanese Patent Application No. 2019-550352 (with English language translation), 6 pages.

Yuki Yasui, et al., "Multimodal Speech Recognition Using Deep Autoencoder With Deep Images of The Lips," IPSJ SIG Technical Report, vol. 2017—SLP-117, No. 2, 2017, 17 pages (with English language translation).

International Search Report dated Jan. 22, 2019 in PCT/JP2018/039987 filed on Oct. 26, 2018, 2 pages.

Ikeda et al., "Study of Accuracy Improvement on Network Anomaly Detection with Autoencoder," Proceedings of the 2017 IEICE general conference, p. 127, ISSN 1349-1369, Mar. 2017 (with English translation) (total 6 pages).

Ikeda et al., "Inferring causal parameters of anomalies detected by autoencoder using sparse optimization," Institute of Electronics, information and Communication Engineers, IEICE Technical Report, IN2017-18 (Jun. 2017), vol. 117, No. 89, pp. 61-66, ISSN 0913-5685, Jun. 2017 (with partial English translation) (total 11 pages).

Hodge et al., "A Survey of Outlier Detection Methodologies," Artificial Intelligence Review 22, pp. 85-126, 2014 (total 42 pages).

* cited by examiner

FIG.8

| data | keys | values | vector size |
|---|---|---|---|
| flow | src IP group, dst IP group, src port, dst port, or protocol | # of flows, mean or standard deviations of # of packets, bytes, or durations | 315 |
| MIB | node | mean or standard deviations of # of incoming or outgoing bytes among interfaces | 144 |
| syslog | syslog template ID | # of appearance | 682 |

FIG.9

| Failure # | MAE | normal AE | reason of overlooking |
|---|---|---|---|
| #1 | × | × | not reacted |
| #2 | × | × | training data included error logs |
| #3 | ✓✓ | ✓✓ | — |
| #4 | ✓✓ | ✓✓ | — |
| #5 | ✓✓ | ✓✓ | — |
| #6 | ✓ | ✓ | — |
| #7 | ✓✓ | × | reacted but not reach threshold |
| #8 | × | × | not reacted |
| #9 | × | × | not reacted |
| #10 | ✓✓ | ✓ | — |
| #11 | ✓✓ | ✓✓ | — |
| #12 | ✓✓ | ✓✓ | — |
| #13 | ✓ | ✓ | — |
| #14 | ✓ | ✓ | — |
| #15 | ✓ | ✓ | — |
| #16 | × | × | not reacted |
| #17 | ✓ | ✓ | — |
| #18 | ✓✓ | ✓✓ | — |
| #19 | ✓✓ | ✓✓ | — |
| #20 | ✓✓ | ✓✓ | — |
| TPR (ratio of detected and verified failures) | 0.55 | 0.45 | |

FIG.10

|  | flow | mib | syslog |
|---|---|---|---|
| autoencoder | 5.54E-4 | 2.45E-4 | 6.13E-5 |
| MAE | 5.29E-4 | 2.29E-5 | 2.59E-6 |

ANOMALY DETECTION APPARATUS, ANOMALY DETECTION METHOD, AND PROGRAM

TECHNICAL FIELD

The present invention relates to a technique for detecting anomalies that occur as breakdown of correlations across data types, in a technique for monitoring a variety of data collected from a system to detect system anomalies.

BACKGROUND ART

A technique is proposed, in a system with a function of observing various data in real time, in which correlations between metrics at normal time are learned using normal data by projecting the correlations into a space of dimensions the number of which is smaller than that of a normal data space, and "degree of anomaly" of test data is output when correlations between metrics at normal time are disrupted in the test data (Non-Patent Documents 1 to 4).

In this technique, there is a problem that, as the number of observed pieces of data increases, the relationship between the normal data space and the projection data space to be learned increases in combination, resulting in an increase in the required normal data (Non-Patent Document 3).

PRIOR ART DOCUMENTS

Non-Patent Documents

[Non-Patent Document 1] Hodge, Victoria J. and Jim Austin. "A survey of outlier detection methodologies." Artificial intelligence review 22.2 (2004): 85-126.

[Non-Patent Document 2] Mayu Sakurada, Takehisa Yairi, "Dimensionality Reduction with the Autoencoder for Anomaly Detection of Spacecrafts", Proceedings of the Annual Conference of JSAI 28, 1-3, 2014.

[Non-Patent Document 3] Yasuhiro Ikeda, Yuusuke Nakano, Keishiro Watanabe, Keisuke Ishibashi, Ryoichi Kawahara, "A study of accuracy improvement on network anomaly detection with autoencoder", IEICE, Mar. 2017

[Non-Patent Document 4] Yasuhiro Ikeda, Keisuke Ishibashi, Yuusuke Nakano, Keishiro Watanabe, Ryoichi Kawahara, "Inferring causal parameters of anomalies detected by autoencoder using sparse optimization", IEICE, IN2017-18

SUMMARY OF INVENTION

Problem to be Solved by the Invention

An object of the present invention is to provide a technique for solving the problem in that, as the number of observed pieces of data increases, the space in which normal data is distributed increases in combination, in an anomaly detection technique in which multiple types of pieces of data are input.

Means for Solving Problems

According to the disclosed technique, there is provided an anomaly detection apparatus having a function of an autoencoder that includes an input layer, hidden layers, and an output layer, and that learns parameters such that data of the input layer is reproduced in the output layer, the anomaly detection apparatus including:

input means that input normal data of a plurality of types;

learning means that learn parameters such that normal data of the input layer is reproduced in the output layer by learning a feature across data types using data of a dimension which is smaller than a dimension of the normal data; and anomaly degree calculation means that input test data to the autoencoder using the parameters learned by the learning means, and calculate anomaly degree of the test data based on output data of the autoencoder and the test data.

Effects of the Invention

According to the disclosed technique, there is provided a technique for solving the problem in that, as the number of observed pieces of data increases, the space in which normal data is distributed increases in combination, in an anomaly detection technique in which multiple types of pieces of data are input.

BRIEF DESCRIPTION OF DRAWINGS

FIG. 8 is a diagram showing a list of key and value when a feature vector is generated from collected data, when detecting an anomaly in a test bed using examples 6 and 7 based on the example 1;

FIG. 9 is a table showing whether or not each fault is detected when the anomaly detection of the test bed is performed using examples 6 and 7 based on the example 1.

FIG. 10 is a diagram illustrating a result of comparing the reconstruction error of the learning data of each data type with the MAE learned by the method of example 1 and a normal autoencoder in which the number of nodes of the hidden layers is the same as that of the third layer of the MAE.

MODE FOR CARRYING OUT THE INVENTION

Hereinafter, embodiments of the present invention (the present embodiment) will be described with reference to the drawings. The embodiments described below are only one example, and the embodiments to which the present invention is applied are not limited to the following embodiments.

(Apparatus Configuration)

Figure 1:
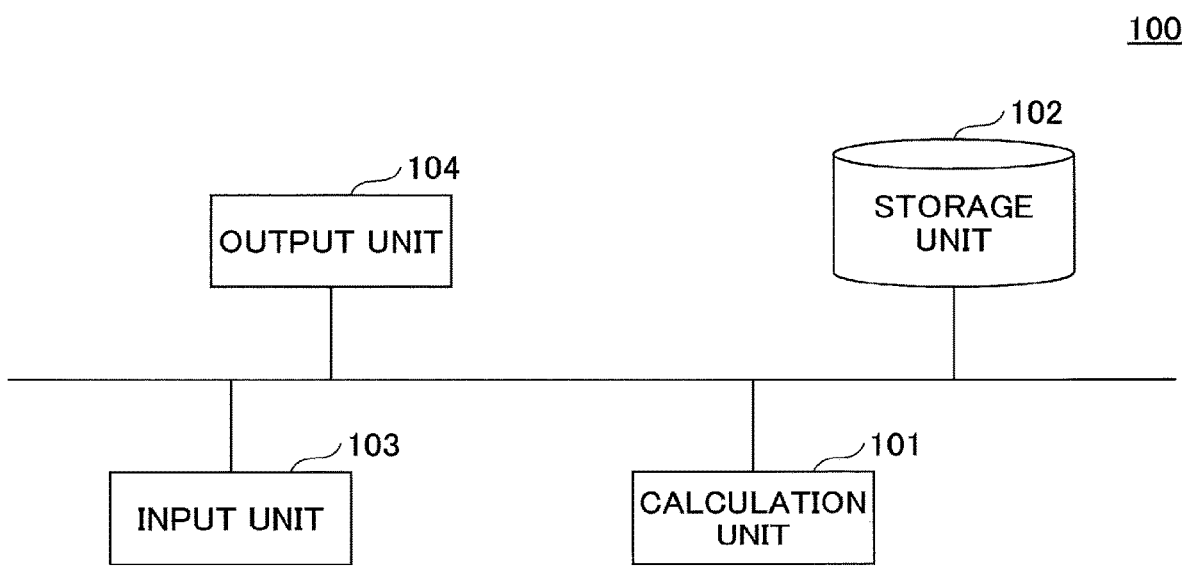
FIG. 1 is a block diagram illustrating an example of a configuration of an anomaly detection apparatus according to an embodiment of the present invention.

FIG. 1 shows an example of a configuration of an anomaly detection apparatus 100 according to an embodiment of the present invention. As illustrated in FIG. 1, there is provided a calculation unit 101, a storage unit 102, an input unit 103, and an output unit 104.

The calculation unit 101 performs parameter learning processing in a learning phase and anomaly calculation processing in a test phase. Details of the processing performed by the calculation unit 101 will be described later. The storage unit 102 is a storage which stores various data, parameters, and the like. The input unit 103 inputs various types of data, and the output unit 104 outputs an anomaly degree.

(Example of Hardware Configuration)

The anomaly detection apparatus 100 can be implemented by causing a computer to execute a program describing the processing contents described in this embodiment. That is, the anomaly detection apparatus 100 can be realized by executing a program corresponding to the processing performed by the anomaly detection apparatus 100 using hardware resources such as a CPU or a memory embedded in a computer. The program can be recorded on a computer-readable recording medium (portable memory, etc.), stored or distributed. It is also possible to provide the program via a network, such as the Internet or e-mail.

Figure 2:
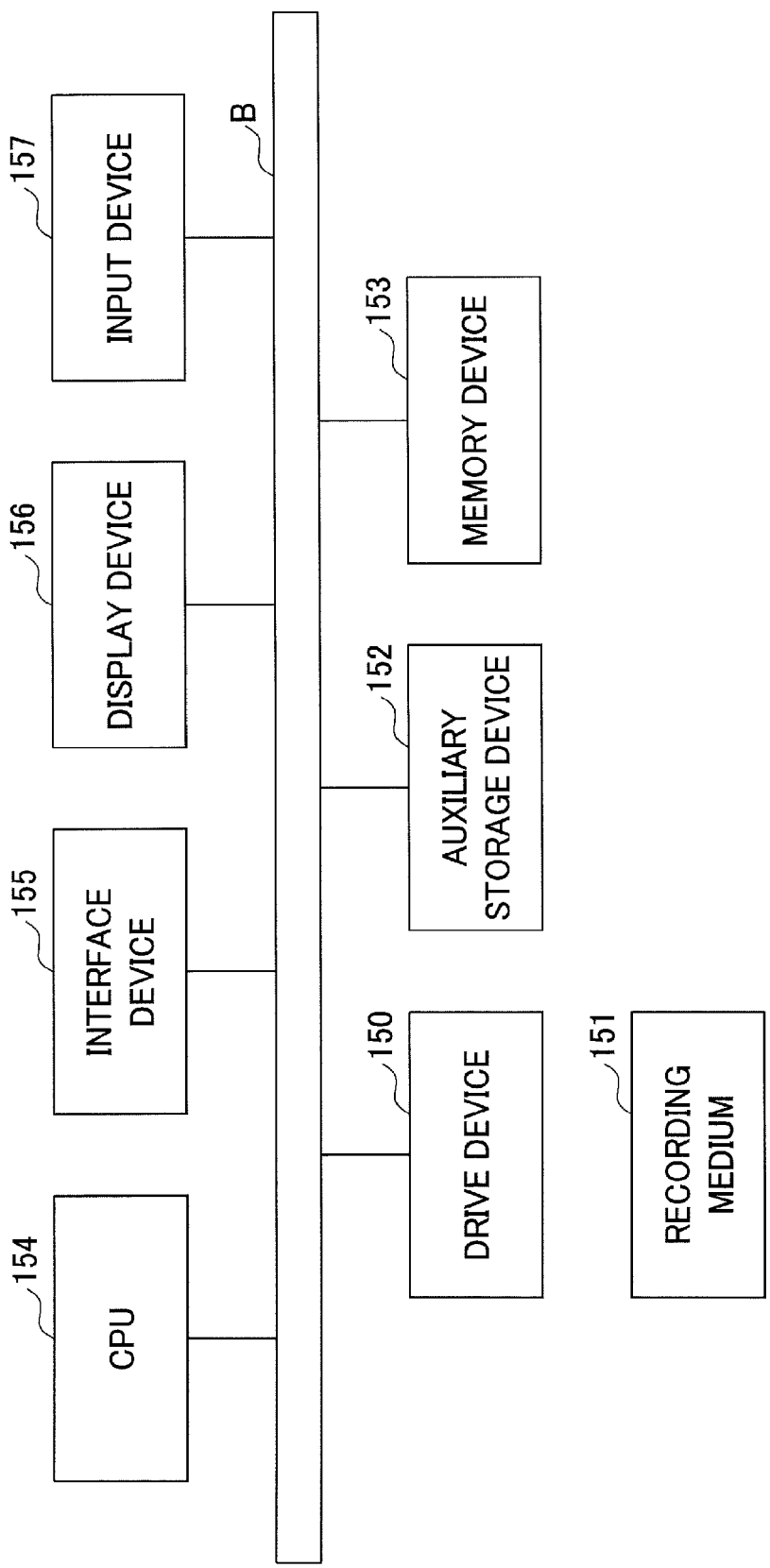
FIG. 2 is a diagram illustrating an example of a hardware configuration of an anomaly detection apparatus.

FIG. 2 is a diagram illustrating an example of the hardware configuration of the computer according to the present embodiment. The computer of FIG. 2 includes a drive device 150, an auxiliary storage device 152, a memory device 153, a CPU 154, an interface device 155, a display device 156, an input device 157, and the like, interconnected by a bus B.

A program for implementing processing by the computer is provided, for example, by a recording medium 151 such as a CD-ROM or a memory card. When the recording medium 151 on which the program is stored is set in the drive device 150, the program is installed in the auxiliary storage device 152 from the recording medium 151 through the drive device 150. However, the installation of the program need not necessarily be performed by the recording medium 151, and the program may be downloaded from another computer via a network. The auxiliary storage device 152 stores the installed program and stores necessary files, data, and the like.

The memory device 153 reads out the program from the auxiliary storage device 152 and stores the program when an instruction to start the program is issued. The CPU 154 performs the function related to the anomaly detection apparatus 100 according to a program stored in the memory device 153. The interface device 155 is used as an interface for connecting to a network. The display device 156 displays a GUI (Graphical User Interface) by a program or the like. The input device 157 may comprise a keyboard and a mouse, a button, touch panel, or the like, and may be used to input various operating instructions. The display device 156 may not be provided.

(Example of Operation)

Hereinafter, examples 1 to 8 will be described as operation examples of the anomaly detection apparatus 100. Hereinafter, the example 1 is base processing, and as to examples 1-8, descriptions are given basically for differences from the example 1 and for features added to the example 1. Further, any of the examples 1 to 8 may be implemented in combination unless there is a conflict.

Before describing each example in detail, an outline of each example will be described.

(1) Overview of Example 1

First, an outline of the operation performed by the anomaly detection apparatus 100 will be described. The anomaly detection method that is the basis of the anomaly detection method performed by the anomaly detection apparatus 100 is as follows.

First, for data x represented by a multidimensional numerical vector, as for a mapping f to a space Z different from the original data space X and a mapping g from Z to the original data space X, when normal data is provided as x, x is projected to Z with f, and f and g are learned such that the reconstruction error, which is the distance between the reconstructed data projected by g to the original data space and the original data, is as small as possible. Then, for test data subject to anomaly detection, the reconstruction error when the test data is projected from X to Z by the mapping f and from Z to X by the mapping g is regarded as an anomaly degree of the data.

The outline of the anomaly detection method performed by the anomaly detection apparatus 100 according to the example 1 is as follows.

Normal data is input to the anomaly detection apparatus 100. Here, there are multiple types of data (K types in total). On the original data space X, data of type k exists on the subspace X_k of X, and the anomaly detection apparatus 100 learns a mapping f1_$k$ ($k$=1, ... , K) from X_k to the subspace Y_k of another space Y; a mapping f2 that maps the data on the space Y into the new space Z; a mapping g1 from Z to Y; and a mapping g2_$k$ ($k$=1, ... , K) from the subspace Y_k of Y to the subspace X_k of the original data space X.

Then, by using each learned mapping, the anomaly detection apparatus 100 assumes reconstruction error as anomaly degree, the reconstruction error being obtained by projecting test data to Y by the mapping f1_$k$ ($k$=1, ... , K), projecting Y to Z by the mapping f2, projecting Z to Y by the mapping g1, and projecting Y to X by the mapping g2_$k$ ($k$=1, ... , K). Accordingly, anomaly detection is performed by extracting features that span data types.

(2) Overview of Example 2

In the example 2, in the example 1, data is classified from viewpoints other than data type, and each is considered to be present in the subspace X_k of X.

(3) Outline of Example 3

In the example 3, for each mapping in the example 1, the mapping f from space A to space B is learned as a composite mapping of n mappings, such as f=f1∘f2∘ ... , of_n.

(4) Overview of Example 4

In the example 4, in the example 1, the space in which normal data is ultimately mapped is space P instead of X, and the anomaly degree of data is given as a value obtained by inverting positive/negative of a likelihood function in which normal data is observed under a probability distribution when parameters are given as values when normal data is mapped onto space P, for a predetermined probability distribution F.

(5) Outline of Example 5

In the example 5, in the example 1, for a predetermined probability distribution G, parameters are given as values when normal data is mapped on space Z, random numbers are given on space Z' according to the probability distribution, and mapping from space Z' to Y is learned.

(6) Outline of Example 6

In the example 6, in examples 1 to 5, the mapping parameters obtained by learning each of the mapping parameters individually are set to initial values, and mapping parameters are learned such that the distance between the original data and the reconstructed data becomes small, so that learning is performed such that the distance between the reconstructed data and the original data for each data type becomes smaller.

(7) Overview of Example 7

In the examples 7, in the examples 1 to 6, a weight w_k considering the ease of reconstruction for each data type is used to give anomaly degree of data as a weighted average of the reconstruction error for each data type.

(8) Outline of Example 8

In the examples 8, in the examples 1 to 6, parameters are learned so as to minimize the weighted average of reconstruction errors for each data type when learning each mapping parameter using the weight w_k considering the ease of reconstruction for each data type.

Hereinafter, examples 1 to 8 will be described in more detail.

Example 1

First, the example 1 will be described. In the example 1, when performing anomaly detection by learning a correlation of various types of data, anomaly detection is performed such that feature extraction based on correlation of each data type and feature extraction based on learning of correlation across data types are performed. The various types of data may be referred to as multiple types of data. Various types of data include, for example, MIB data, flow data, syslog, CPU information, and the like. In the examples 1 to 8, anomaly detection is performed by unsupervised learning.

Here, an example of an algorithm in which an autoencoder (Non-Patent Document 2) is applied is shown as an anomaly detection algorithm for performing feature extraction performed by the anomaly detection apparatus 100. The autoencoder has an input layer, hidden layers, and an output layer, and is a function using a neural network to learn parameters for reproducing data of the input layer at the output layer. The anomaly detection apparatus 100 includes a function of the autoencoder. Specifically, the function of the autoencoder corresponds to calculation processing by the calculation unit 101.

Figure 3:
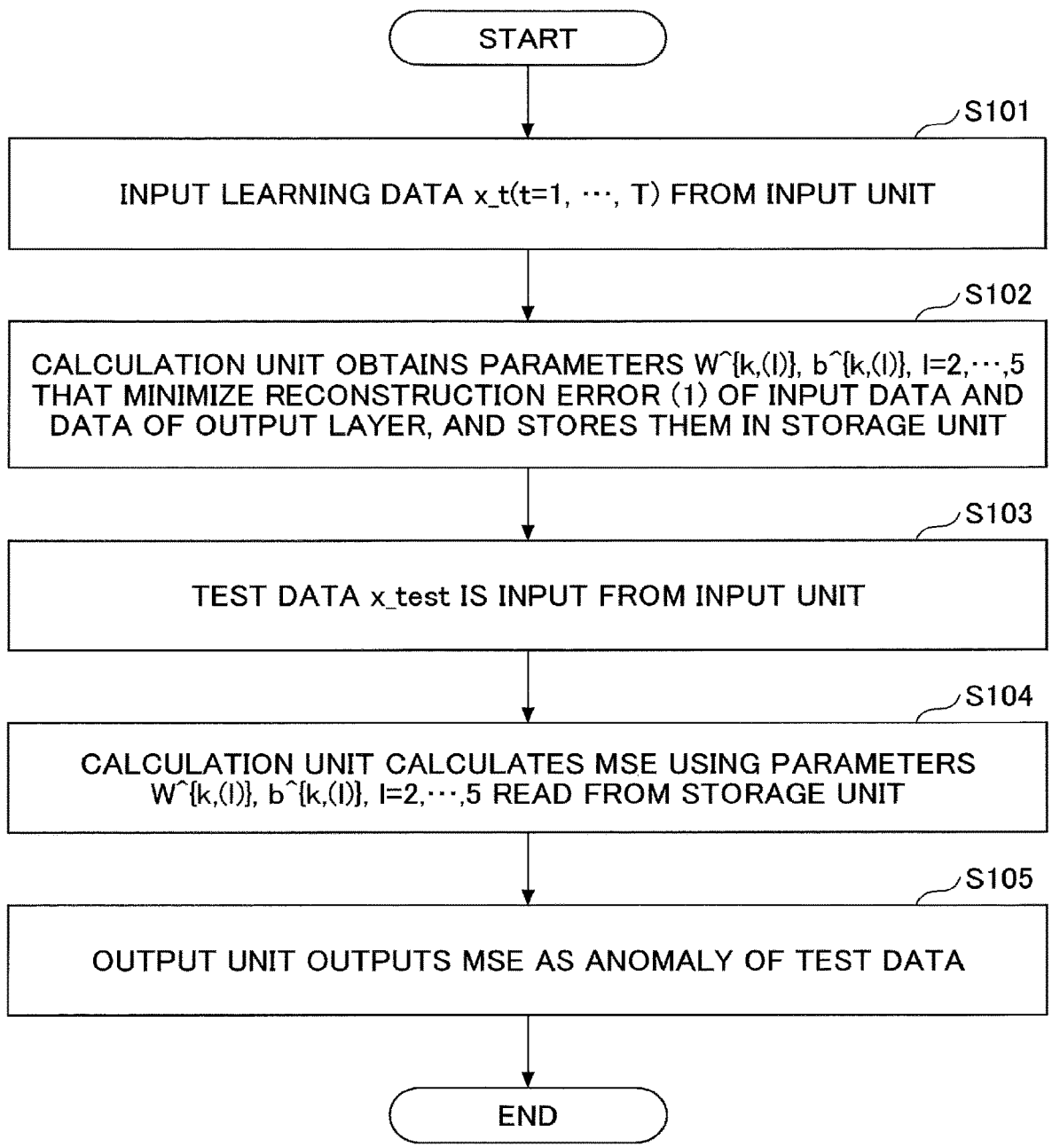
FIG. 3 is a flowchart illustrating an operation of an anomaly detection apparatus according to an example 1.

Referring to the flowchart of FIG. 3, an operation of the anomaly detection apparatus 100 according to the example 1 will be described. In FIGS. 3, S101 and S102 are learning phases and S103-S105 are test phases (also referred to as anomaly detection phases).

First, in the learning phase S101, learning data x_t (t=1, . . . , T) is input from the input unit 103. Learning data is normal data. The input learning data is stored in the storage unit 102. The input learning data is data which has K types of data, and is expressed as x_t={x_t^1, . . . , x_t^K}. Hereinafter, in some cases, t is omitted and the data of the k_th type is denoted by x'^k. Note that data x is a vector of a certain dimension. Also, t represents time, for example.

Next, in S102, the calculation unit 101 performs learning of parameters using the learning data as follows. Here, the model to be learned is an anomaly detection model that applies a multimodal autoencoder consisting of five layers. For multimodal encoders, for example, Zhang, Hanwang, et al. "Start from scratch: Towards automatically identifying, modeling, and naming visual attributes." Proceedings of the 22nd ACM international conference on Multimedia. ACM, 2014., etc. may be referenced.

Figure 4:
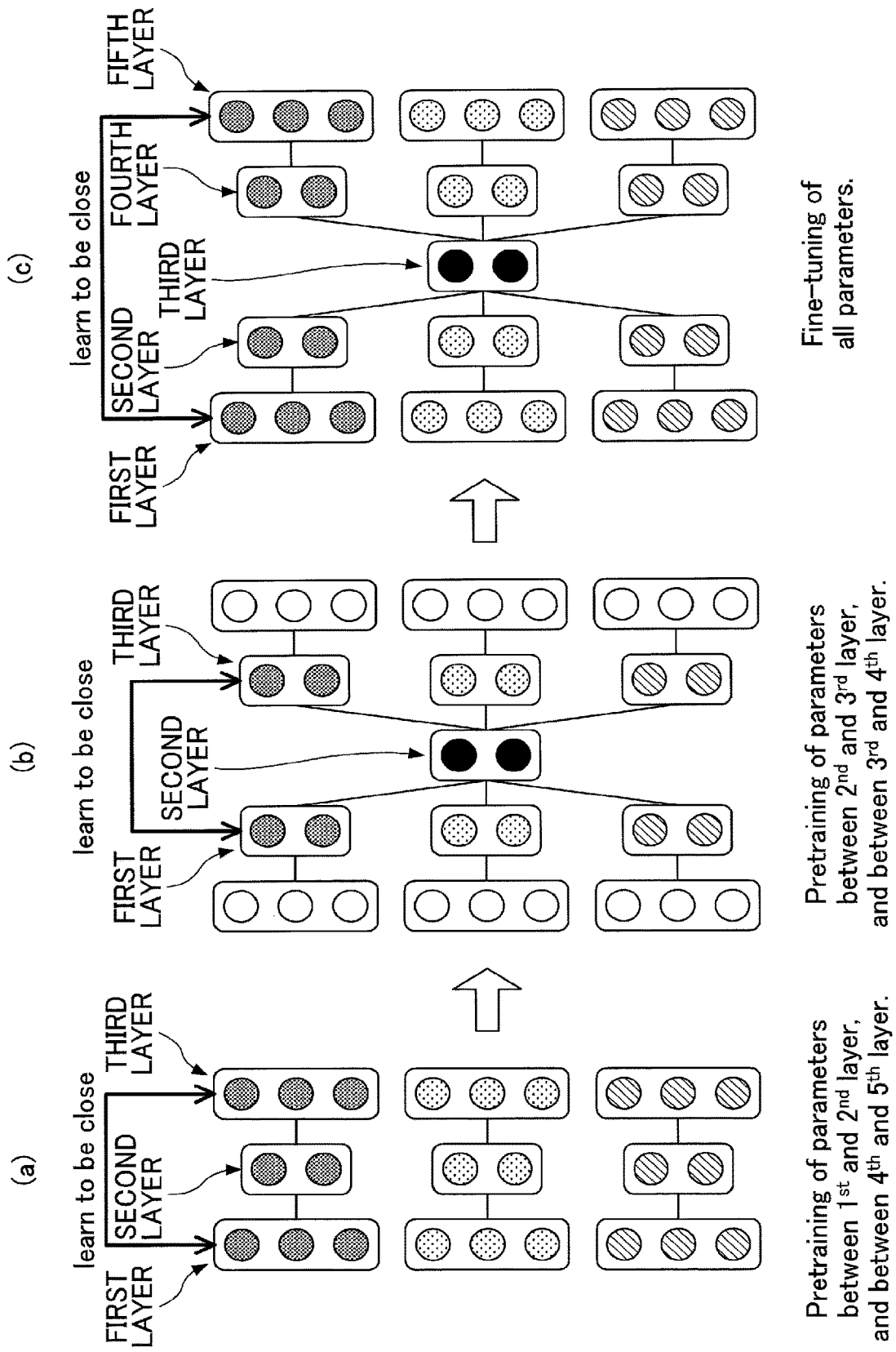
FIG. 4 is a diagram for explaining a learning method using a model used in the example 1 and an example 6.

An image diagram of a model of a multimodal autoencoder consisting of five layers is shown in FIG. 4(c). The first layer is an input data layer, the second and the fourth layers are layers for extracting features for each data type, and the third layer is a layer for extracting features across data types. The purpose of the model is to learn the parameters so that the data input at the first layer is reconstructed at the fifth layer of output.

More specifically, for example, each of the second layer and the fourth layer includes nodes that extract features of the MIB data using data in which dimension is reduced from the MIB data, nodes that extract features of the flow data using data in which dimension is reduced from the flow data, nodes that extract features of syslog using data in which dimension is reduced from the syslog, and nodes that extract features of the CPU information using data in which dimension is reduced from the CPU information. The third layer node extracts features that span these data types by weighting and adding the output data from the second layer. FIGS. 4(a) and 4(b) will be described in Example 6.

In FIG. 4(c), the mapping from the first layer to the second layer corresponds to the aforementioned mapping f1_k (k=1, . . . , K), the mapping from the second to the third layer corresponds to the mapping f2, the mapping from the third to the fourth layer corresponds to the mapping g1, and the mapping from the fourth layer to the fifth layer corresponds to the aforementioned mapping g2_k (k=1, . . . , K).

Specifically, the calculation unit 101 learns the parameters W^{k,(l)}, b^{k,(l)}, l=2, . . . , 5, for all k by solving the following optimization problem. That is, the calculation unit 101 obtains parameters W^{k,(l)}, b^{k,(l)}, l=2, . . . , and 5 that minimize the reconstruction error of the input data and the output layer data (using the following equation (1), here MSE), and stores the obtained parameters in the storage unit 101.

[Formula 1]

$$\min_{W^{(l)}, b^{(l)}} \frac{1}{T} \sum_{t=1}^{T} \sum_{k=1}^{K} \sum_{i=1}^{N_k} \frac{(x_{t,i}^{k,(5)} - x_{t,i}^k)^2}{N_k}, l=2, \ldots, 5, \quad (1)$$

N_k is the dimension of the data type k, and x^{k,(l)}, l=2, 4, and 5 denote the output of the first layer of the k_th data type, and x^{(3)} denotes the output of the third layer, respectively as follows.

[Formula 2]

$$x^{k,(2)} = \phi^{(2)}(W^{k,(2)} x^k + b^{k,(2)}), \forall k, \quad (2)$$

[Formula 3]

$$x^{(3)} = \phi^{(3)}\left(\sum_{k=1}^{K} W^{k,(3)} x^{k,(2)} + b^{(3)}\right), \quad (3)$$

[Formula 4]

$$x^{k,(4)} = \phi^{(4)}(W^{k,(4)}x^{k,(3)} + b^{k,(4)}), \forall k,\quad (4)$$

[Formula 5]

$$x^{k,(5)} = \phi^{(5)}(W^{k,(5)}x^{k,(4)} + b^{k,(5)}), \forall k,\quad (5)$$

In each of the above equations, W^{k,(l)} is a connection weight from l-1 layer to l layer for the k_th data type, b^{k,(l)} is the l layer bias term for the k_th data type, and φ^(l) is the l layer activation function. Here, the number of dimensions of the second and fourth layers is less than the number of dimensions of each data. This reduces the dimensions for each data type, and the correlation across data types is learned using the dimension-reduced data at the third layer. Thus, it is possible to prevent the increase in the normal space in combination due to the increase in dimensions having no correlation across data types. The parameters learned by the calculation unit 101 are stored in the storage unit 102.

Learning of the aforementioned mapping f1_k (k=1, . . . , K), f2, g1, and g2_k (k=1, . . . , K) correspond to learning of parameters W^{k, . . . , l}, b^{k, . . . , l}, l=2, . . . , 5.

The test data x_test is input from the input unit 104 in S103 of the test phase. The calculation unit 101 calculates the vector x_test^(5) of the output layer using the above-described equations (2) to (5) based on the parameters W^{k,(l)}, b^{k,(l)}, l=2, . . . , 5, for all k stored in the storage unit 102 and calculates the Mean Square Error (MSE) as an anomaly degree (S104). The anomaly degree is output from the output unit 104 (S105). That is, in the test phase, test data is input to an autoencoder (here, a multimodal autoencoder) using the parameters learned in the learning phase, and the degree of anomaly of the test data is calculated based on the output data of the autoencoder and the test data.

Example 2

Next, the example 2 will be described. In the example 2, the data in the example 1 is not classified by data type, but is classified from other perspectives. Classification methods include classifying data according to attributes, for example, by data collection devices or by collection points. In addition, the data may be clustered in advance and categorized according to the cluster.

The processing contents of the anomaly detection apparatus 100 according to the example 2 are the same as those according to the example 1. In the example 2, the K type data x_t={x_t^1, . . . , x_t^K} of the example 1 may be classified as the data of K groups classified in terms of the example 2.

The term "data type" may be interpreted as including both the classification of data in the example 1 and the classification of data in the example 2.

Also in the example 2, it is possible to prevent the increase of normal space in combination due to the increase of dimensions having no correlation across data types.

Example 3

Next, the example 3 will be described. In the example 3, more complicated feature extraction is performed by further increasing the number of layers of the autoencoder in the example 1. For example, by increasing the number of layers between the first and the second layers and between the fourth and the fifth layers, it is expected that more complicated features can be extracted in feature extraction for each data type. Also, by increasing the number of layers between the second and the third layers and/or the number of layers between the third and the fourth layers, it is expected that more complicated features can be extracted in feature extraction of the entire data.

In accordance with the third embodiment, it is also possible to prevent the increase in normal space in combination due to the increase of dimensions having no correlation across data types. Also, in the example 3, more accurate dimensional reduction can be achieved by increasing the number of layers, particularly when data are complex and dimensional reductions are difficult.

Example 4

Next, the example 4 will be described. In the example 4, instead of representing the degree of anomaly of data by the MSE between the input and output layers in the example 1, the value obtained by inverting positive and negative of a likelihood function in which data of the input layer is observed under a predetermined probability distribution, using a value at the output layer as a parameter, is regarded as anomaly degree. The value obtained by inverting positive and negative of a likelihood function may be replaced by "a value obtained by multiplying the likelihood function by minus". Such definition of anomaly degree is also performed in anomaly detection using Variation Autoencoder. For example, An, Jinwon, and Sungzoon Cho. Variational Autoencoder based Anomaly Detection using Reconstruction Probability. Technical Report, 2015., etc. may be referenced for anomaly detection using Variation Autoencoder.

Figure 5:
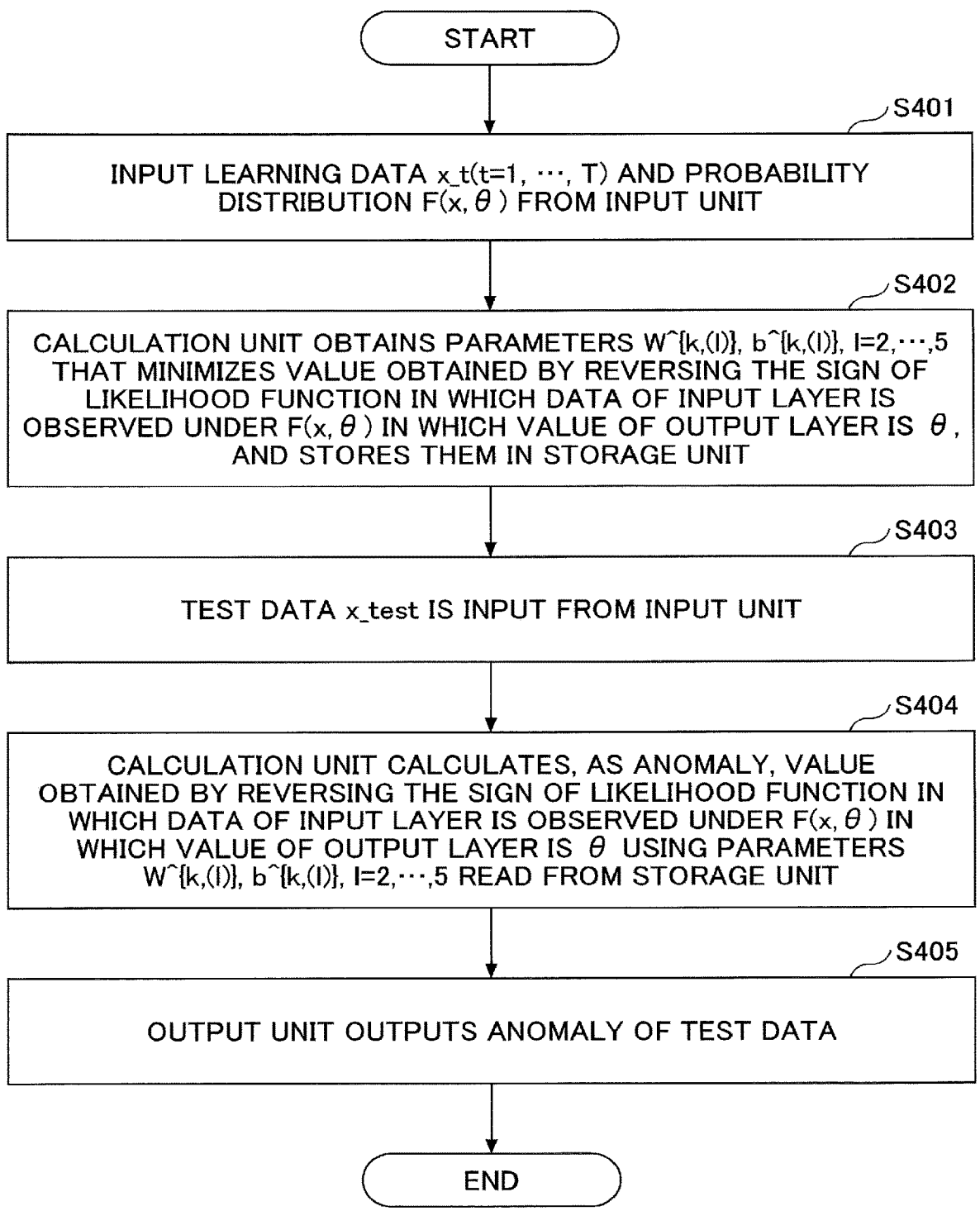
FIG. 5 is a flowchart illustrating an operation of an anomaly detection apparatus according to an example 4.

FIG. 5 is a flowchart illustrating an operation of the anomaly detection apparatus 100 according to the example 4. In FIG. 5, S401, S402 are learning phases and S403-S405 are test phases.

In S401, learning data x_t (t=1, . . . , T) and a probability distribution F (x, θ) are input from the input unit 103. The input learning data is stored in the storage unit 102.

In S402, the calculation unit 101 obtains parameters W^{k,(l)}, b^{k,(l)}, l=2, . . . , 5 so as to minimize the value obtained by inverting the positive and negative of the likelihood function in which the data of the input layer is observed under F(x,θ) with the value in the output layer as θ, and stores the obtained parameters in the storage unit 102. That is, in the example 4, the calculation unit 101 solves the optimization problem in which equation (1) is an objective function representing minimizing the value obtained by inverting the positive and negative of the likelihood functions in which the data of the input layer is observed under F(x, θ) with the value in the output layer as θ, in the equations (1) to (5) of the example 1.

The test data x_test is input from the input unit 104 in S403 of the test phase.

In S404, the calculation unit 101 calculates a value, as the anomaly degree, obtained by inverting the positive and negative of the likelihood function in which the data of the input layer is observed under F(x, θ) where the value in the output layer is θ, using parameters W^{k,(l)}, b^^{k,(l)}, l=2, . . . , 5 read from the storage unit 102. In S405, the output unit 104 outputs the anomaly degree of the test data.

As noted above, in Example 4, instead of calculating the MSE in Example 1, the positive/negative inverted value of the likelihood function is calculated and the parameters are learned to minimize the value. When defining the anomaly degree, the value is defined as the anomaly degree in the test data.

The example 4 also prevents increase in normal space in combination due to increase of dimensions having no correlation across data types.

Example 5

Next, the example 5 will be described. In the example 5, in the example 1, a new layer is defined between the third layer and the fourth layer, random numbers generated by a predetermined probability distribution in which the third layer value is used as a parameter are used as the values of the new layer, and the value is mapped to the fourth layer in the example 1. The mapping that introduces such random numbers is also performed in the Variational Autoencoders (e.g., An, Jinwon, and Sungzoon Cho. Variational Autoencoder based Anomaly Detection using Reconstruction Probability. Technical Report, 2015), where normal distribution is given as the probability distribution, and random numbers are generated by regarding the values in the third layer as mean and variance of the normal distribution, and the random numbers are then used as the values of the fourth layer.

The processing flow of the anomaly detection apparatus 100 according to the example 5 is basically the same as the processing flow shown in FIG. 3. However, in the example 5, in S102, the optimization problem of equations (1) to (5) in the example 1 is solved with the modifications described below.

That is, in the example 5, predetermined half of the values of each dimension of $x\hat{}(3)$ calculated by equation (3) are regarded as the mean and the remaining half as the variance, and the covariance is set to 0, and the random number $x'\hat{}(3)'$ of dimensions of half of the number of dimensions of $x(3)$ is generated according to the normal distribution. The equation for mapping $x'\hat{}(3)'$ to the fourth layer is an equation in which the input $x'''(3)$ in the equation (4) is regarded to be $x\hat{}(3)'$, and $W\hat{}\{k,(4)\}$ and $b\hat{}\{k,(4)\}$ are matrices and vectors matched to the dimensions of $x'\hat{}(3)'$. The same is true for the test phase.

The example 5 also prevents increase in normal space in combination due to increase of dimensions having no correlation across data types.

Example 6

Next, the example 6 will be described. The example 6 is based on the example 1 or the example 4. In the case in which the example 1 is used as the base, the learning of the mapping in the example 1 is performed individually for each data type, and the learning of the parameters is performed so that the reconstruction is sufficiently performed for each data type. Like this, it is also applicable to Examples 2-5 that the learning of mapping is performed individually for each data type.

For example, when a model based on the autoencoder of the example 1 is used, parameters are learned by optimization of equation (1). At this time, when data types that are easy to reconstruct and data types that are difficult to reconstruct are mixed, the square error in the equation (1) is likely to be larger, and all parameters are updated so as to reduce the square error of the latter. Therefore, there may not be enough learning to reconstruct the former data type.

Accordingly, in the example 6, parameters by which reconstruction is sufficiently performed for each data type are first learned, and learning is performed such that the overall reconstruction error is reduced by setting the parameters as the initial values.

Figure 6:
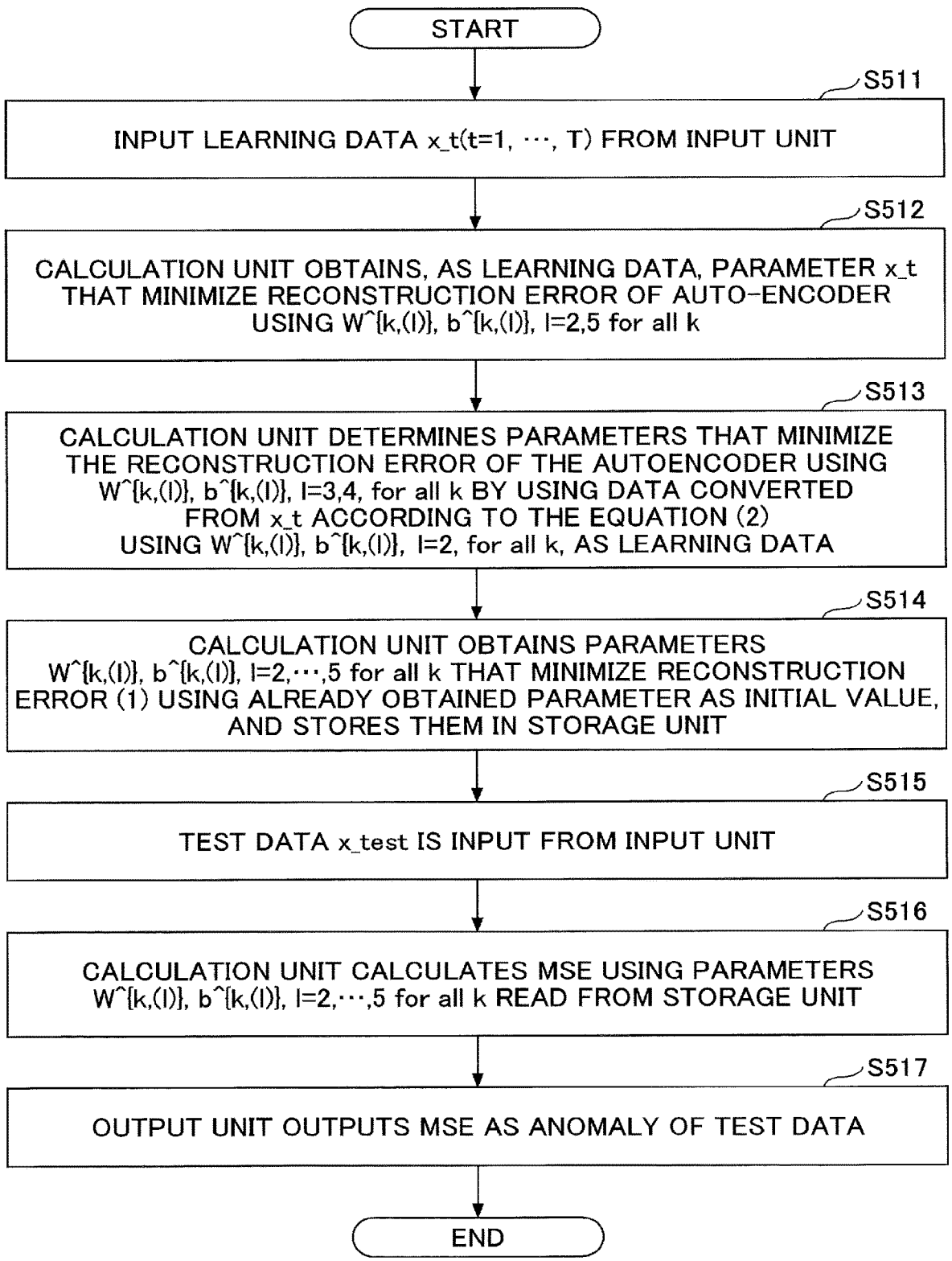
FIG. 6 is a flowchart illustrating an operation of an anomaly detection apparatus according to an example 6 based on the example 1.

FIG. 6 is a flowchart illustrating an operation of the anomaly detecting apparatus 100 according to the example 6 which is based on the example 1. Here, an example of a multimodal autoencoder similar to that of Example 1 is shown. In FIG. 6, S511-S514 are learning phases and S515-S517 are test phases.

In S511, the learning data x_t (t=1, ..., T) is input from the input unit 103. The input learning data is stored in the storage unit 102.

Subsequently, in S512 and S513, the calculation unit 101 performs learning of parameters $W\hat{}\{k,(l)\}$, $b\hat{}\{k,(l)\}$, l=2,5, for all k so as to sufficiently perform the reconstruction by feature extraction for each data type, and learning of parameters $W\hat{}\{k,(l)\}$, $b\hat{}\{k,(l)\}$, l=3,4, for all k so as to sufficiently perform the reconstruction by feature extraction for all data types, as prior learning, respectively.

That is, as shown in FIG. 6, in S512, the calculation unit 101 determines parameters that minimize the reconstruction error of the autoencoder using $W\hat{}\{k,(l)\}$, $b\hat{}\{k,(l)\}$, l=2,5, for all k by using x_t as learning data. In S513, the calculation unit 101 determines parameters that minimize the reconstruction error of the autoencoder using $W\hat{}\{k,(l)\}$, $b'\hat{}\{k,(l)\}$, l=3,4, for all k by using data converted from x_t according to the equation (2) using $W\hat{}\{k,(l)\}$, $b\hat{}\{k,(l)\}$, l=2, for all k, as learning data.

FIGS. 4(a) and (b) show an image of pre-learning in S512 and S513. First, as shown in FIG. 4(a), for the autoencoder whose parameters between the first and second layers are $W\hat{}\{k, \{l\}$, $b\hat{}\{k, \{l\}$, l=2, for all k, and the parameters between the second and third layers are $W\hat{}\{k, \{l\}$, $b\hat{}\{k, \{l\}$, l=5, for all k, the parameters are learned so that the reconstruction error of the input data and the output data is reduced using normal data.

Next, as shown in FIG. 4(b), for the autoencoder in which the parameters between the first and second layers are $W\hat{}\{k, \{l\}$, $b'''\hat{}\{k, \{l\}$, l=3, for all k, and the parameters between the second and third layers are $W\hat{}\{k,(l)\}$, $b'\hat{}\{k,(l)\}$, l=4, for all k, data obtained by converting normal data by the equation (2) using $W\{k,(l)\}$, $b\hat{}\hat{}\{k,(l)\}$, l=2, for all k is input, and the parameters are learned so that the reconstruction error is reduced.

Then, as shown in FIG. 4(c), the learned parameters are used as initial values to learn equation (1).

More specifically, in S514 of FIG. 6, the calculation unit 101 calculates the parameter $W\hat{}\{k,(l)\}$, $b\hat{}\{k,(l)\}$, l=2, ..., 5 for all k so as to minimize the reconstruction error (equation (1)) by using the already obtained parameters in S512 and S53 as initial values, and stores the obtained parameters in the storage unit 102.

The processing contents of the test phases S515 to S517 are the same as those of S103 to S105 of FIG. 3 in the example 1.

When the example 4 is used as the base, the calculation unit 101 learns the values obtained by inverting the positive and negative of the likelihood function in the learning of $W\hat{}\{k,(l)\}$, $b'\hat{}\{k,(l)\}$, l=2,5, for all k in the same manner as in the example 4, and learns the parameters such that the reconstruction error becomes small in the learning of $W\hat{}\{k,(l)\}$, $b\hat{}\{k,(l)\}$, l=3,4, for all k.

Figure 7:
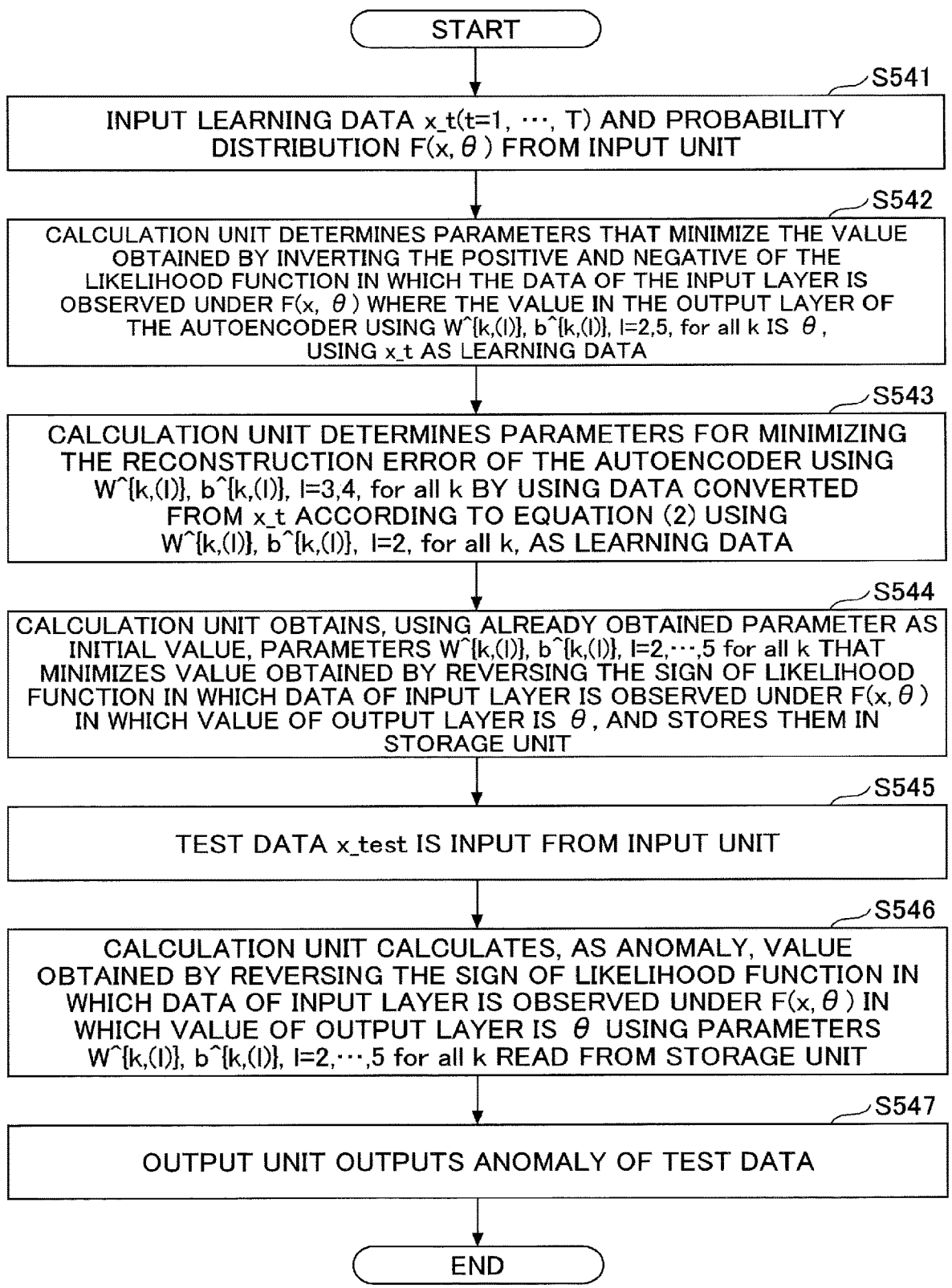
FIG. 7 is a flowchart illustrating an operation of an anomaly detection apparatus according to an example 6 based on the example 4.

FIG. 7 is a flowchart illustrating an operation of the anomaly detection apparatus 100 according to the example 6 based on the example 4. In FIG. 7, S541-S544 are learning phases and S545-S547 are test phases.

In S541, the learning data x_t (t=1, . . . , T) and the probability distribution F (x, θ) are input from the input unit 103.

In S542, the calculation unit 101 determines parameters that minimize the value obtained by inverting the positive and negative of the likelihood function in which the data of the input layer is observed under F(x, θ) where the value in the output layer of the autoencoder using W^{k,(l)}, b^{k, (l)}, l=2,5, for all k is θ, using x_t as learning data.

In S543, the calculation unit 101 determines parameters for minimizing the reconstruction error of the autoencoder using W^{k,(l)}, b^{k,(l)}, l=3,4, for all k by using data converted from x_t according to equation (2) using W^{k, (l)}, b^{k,(l)}, l=2, for all k, as learning data.

Then, in S544, the calculation unit 101 determines parameters W^{k,(l)}, b^{k,(l)}, l=2, . . . , 5, for all k to minimize the value obtained by inverting the positive and negative of the likelihood function in which the data of the input layer is observed under F(x,θ) with the value in the output layer as θ, using already obtained parameters as the initial values, and stores the obtained parameters in the storage unit 102.

The processing contents in the test phases S545-S547 are the same as those of S403-S405 of FIG. 5 in the example 4.

According to the example 6, in addition to the effect of the examples 1 and 4, there is an effect of solving the problem that the ease of learning for each data type affects the learning of the correlation of the whole data and the calculation of the anomaly degree of test data.

Example 7

Next, the example 7 will be described. In the example 7, in the calculation of anomaly degree in the examples 1-6, weighting is performed in consideration of ease of reconstruction for each data type or magnitude of likelihood. For example, in the case of the example 1, when the ease of reconstruction varies by data types, the variation of reconstruction error caused by anomaly occurring in data which is easy to reconstruct may be smaller than reconstruction error in normal time of data which is difficult to reconstruct, which causes that such anomaly cannot be detected.

Accordingly, in the example 7, the calculation unit 101 performs calculation of the MSE as a weighted average squared error as follows.

[Formula 6]

$$MSE(x^1, \ldots, x^K) = \sum_{k=1}^{K} w_k \frac{\sum_{i=1}^{N_k} (x_i^{k,(5)} - x_i^k)^2}{N_k}, \quad (6)$$

In the equation (6) above, w_k is a coefficient representing easiness of reconstruction of data type k. The easier the data type k is to reconstruct, the larger the coefficient w_k is, and the more difficult the data type k is to reconstruct, the smaller the coefficient w_k is. This is because data that is easily reconstructed tends to have a smaller reconstruction error, and data that is difficult to reconstruct tends to have a larger reconstruction error, thus the coefficient is used for offsetting the difference. For example, w_k may be given as a reciprocal of the mean of the distribution of reconstruction errors when normal data is input into a learned model.

In the case of the example 4, for data where the likelihood function is likely to be large, the value obtained by inverting positive/negative of the likelihood function is likely to be small and, as in the case of the example 1, the data may cause undetectable anomaly. Therefore, when the weighting of the example 7 is applied to the example 4, as for the value obtained by inverting the positive and negative of the likelihood function for each data type, the weighted value is regarded as the anomaly value in the same way. That is, when the weighting of the example 7 is applied to the example 4, w_k becomes larger when the value obtained by inverting the positive and negative of the likelihood function in data type k is smaller, and w_k becomes smaller when the value obtained by inverting the positive and negative of the likelihood function in data type k is larger.

Also according to the example 7, there is an effect of solving the problem that the ease of learning for each data type affects the learning of the correlation of the whole data and the calculation of the anomaly degree of test data.

Example 8

Next, the example 8 will now be described. In the example 8, at the time of learning in the examples 1-7, weighting is performed in consideration of ease of reconstruction for each data type or the magnitude of the likelihood function, like the example 7. This is to avoid, in learning, that minimization of the MSE of data that is difficult to reconstruct, or minimization of the value obtained by inverting the positive and negative of the likelihood function for data for which likelihood function is likely to be small dominates, as described in the example 6. In the example 8, the calculation unit 101 determines parameters that minimize the following equation in the learning phase.

[Formula 7]

$$\min_{W^{(l)}, b^{(l)}} \frac{1}{T} \sum_{t=1}^{T} \sum_{k=1}^{K} \sum_{i=1}^{N_k} w_k \frac{(x_{t,i}^{k,(5)} - x_{t,i}^k)^2}{N_k}, l = 2, \ldots, 5, \quad (7)$$

As a method of giving w_k, for example, in the case of the example 1, a reciprocal r of the mean of the distribution of the reconstruction error when normal data is input to the model using parameters at that time, etc. may be used.

Also according to the example 8, there is an effect of solving the problem that the ease of learning for each data type affects the learning of the correlation of the whole data and the calculation of the anomaly degree of test data.

Effect of Embodiment

As described above, the technique according to the present embodiment can solve the increase in combination of normal states to be learned and the influence of differences of ease of learning. Here, using the example 6 and the example 7 based on the example 1, the effect of this technique is shown by the result of anomaly detection by the anomaly detection apparatus 100 in a test bed network.

Three types of data, flow data, MIB data, and syslog, were collected from the testbed network, and feature vectors were generated by a combination of key and value as shown in FIG. 8. For syslog, a template ID is assigned using STE (Statistical Template Extraction) and the number of occurrences of that ID is a feature quantity. For STE, for example, Kimura, Tatsuaki, et al. "Spatio-temporal factorization of log data for understanding network events." INFOCOM, 2014 Proceedings IEEE. IEEE, 2014., etc. may be referenced. From the data for one month as normal data, we used data of the time of construction and the time of ±6 hours of trouble reported on the trouble ticket to check whether the trouble reported on the trouble ticket was detected when test data for 1.5 months was used.

FIG. 9 shows whether 20 types of anomalies were detected when the threshold of MSE was set such that the percentage of MSE exceeding the threshold was 3% for periods other than construction and normal periods other than ±6 hours of failure. Here, the MAE shown in FIG. 9 is a method in which Example 6 and Example 7 are combined, and the normal AE is a detection result when input data of all data types is combined into a one-dimensional vector and learned by a single autoencoder. X indicates that the MSE failed to reach the threshold and detection was failed, one check mark indicates that the MSE exceeded the threshold and detection succeeded, and two check marks indicate that the exceeding of threshold in the MSE was confirmed to be due to a failure.

As shown in FIG. 9, the method (MAE) in which Example 6 and Example 7 are combined improves detection accuracy compared to a normal autoencoder. In particular, the failure of #7 can be detected by MAE even though it is overlooked by a normal autoencoder. This is because the anomaly that appeared in the syslog did not appear much as the MSE due to the difference in the reconstruction error for each data type in the normal autoencoder. However, since the MAE takes into account the difference in the reconstruction error for each data type by the example 7, the change in the MSE caused by the anomaly in the syslog can be detected.

In addition, in order to show that the MAE learns the correlation between data after performing dimensional reduction of each data type so as to solve the problem that the space where the normal data is distributed increases in combination, FIG. 10 shows the result of comparing the reconstruction error of the learned data of each data type between the MAE learned by the method of Example 1 and the normal autoencoder in which the number of nodes of the hidden layers is the same as the third layer of the MAE. As shown in FIG. 10, the reconstruction error of the MAE is smaller than that of the normal autoencoder, and it can be seen that the correlation between data types can be learned more accurately in the MAE in the third layer than in the normal autoencoder.

Summary of Embodiments

As described above, according to the present embodiment, there is provided an anomaly detection apparatus having a function of an autoencoder that includes an input layer, hidden layers, and an output layer, and that learns parameters such that data of the input layer is reproduced in the output layer, the anomaly detection apparatus including:

input means that input normal data of a plurality of types;

learning means that learn parameters such that normal data of the input layer is reproduced in the output layer by learning a feature across data types using data of a dimension which is smaller than a dimension of the normal data; and anomaly degree calculation means that input test data to the autoencoder using the parameters learned by the learning means, and calculate anomaly degree of the test data based on output data of the autoencoder and the test data.

The input unit 103 described in the embodiment is an example of the input means, and the calculation unit 101 is an example of the learning means and the anomaly calculation means.

The autoencoder may include a first layer as the input layer, a second layer, a third layer and a fourth layer which are three layers as the hidden layers, and a fifth layer as the output layer, and the learning means may extract, in the second layer and the fourth layer, a feature for each data type with a dimension smaller than a dimension of the normal data, and extract, in the third layer, a feature across data types.

The learning means may learn the parameters so as to minimize an MSE between data of the input layer and data of the output layer, or to minimize a value obtained by inverting positive and negative of a likelihood function in which data of the input layer is observed under a predetermined probability distribution, using a value at the output layer as a parameter.

The learning means may learn parameters in the autoencoder by using parameters, as initial values, obtained by individually executing learning for each data type.

The anomaly degree calculation means may calculate an anomaly degree of the test data as a weighted average of reconstruction error for each data type, by using a weight for each data type.

The learning means may perform learning of parameters so that a weighted average of reconstruction error for each data type is minimized using a weight for each data type.

In addition, according to the present embodiment, there is provided An anomaly detection method detected by an anomaly detection apparatus having a function of an autoencoder that includes an input layer, hidden layers, and an output layer, and that learns parameters such that data of the input layer is reproduced in the output layer, the anomaly detection method including:

an input step of inputting normal data of a plurality of types;

a learning step of leaning parameters such that normal data of the input layer is reproduced in the output layer by learning a feature across data types using data of a dimension which is smaller than a dimension of the normal data; and an anomaly degree calculation step of inputting test data to the autoencoder using the parameters learned by the learning step, and calculating an anomaly degree of the test data based on output data of the autoencoder and the test data.

In addition, according to the present embodiment, there is provided a program for causing a computer to function as each means in the anomaly detection apparatus.

Although the present embodiment has been described above, the present invention is not limited to such specific embodiments, and various modifications and changes are possible within the scope of the present invention as claimed.

The present patent application claims priority based on Japanese patent application No. 2017-212801, filed in the JPO on Nov. 2, 2017, and the entire contents of the Japanese patent application No. 2017-212801 are incorporated herein by reference.

Description of Symbols

100 Anomaly detection apparatus
101 Calculation unit
102 Storage unit

103 Input unit
104 Output unit
150 Drive device
151 Recording medium
152 Auxiliary storage device
153 Memory device
154 CPU
155 Interface device
156 Display device
157 Input device

The invention claimed is:

1. An anomaly detection apparatus having a function of an autoencoder that includes an input layer, hidden layers, and an output layer, and that learns parameters such that data of the input layer is reproduced in the output layer, the anomaly detection apparatus comprising:
processing circuitry configured to
input normal data of a plurality of data types;
learn parameters such that normal data of the input layer is reproduced in the output layer by learning a feature across the data types using data of a dimension which is smaller than a dimension of the normal data; and
input test data to the autoencoder using the learned parameters, and calculate anomaly degree of the test data based on output data of the autoencoder and the test data,
wherein the autoencoder includes
an input layer,
multiple layers as the hidden layers, and
an output layer,
wherein the processing circuitry extracts, in multiple hidden layers, a feature for each data type with a dimension smaller than a dimension of the normal data which is included in the input layer, and extracts, in one hidden layer, a feature across the data types such that
the input layer includes separate pieces of the input normal data, having a first dimension size, for each of the plurality of types of data,
a second layer among the hidden layers that includes separate pieces of data, respectively for each of the plurality of types of data in the first layer, that are generated to have a second dimension size that is smaller than the first dimension size based on a first mapping function, and
a third layer among the hidden layers that includes a single piece of data having the second dimension size and being generated from the feature across the data types of all of the separate pieces of data in the second layer based on a second mapping function,
wherein the first mapping function and the second mapping function are based on the learned parameters.

2. The anomaly detection apparatus as claimed in claim 1, wherein the processing circuitry learns the parameters so as to minimize a Mean Square Error (MSE) between data of the input layer and data of the output layer, or to minimize a value obtained by inverting positive and negative of a likelihood function in which data of the input layer is observed under a predetermined probability distribution, using a value at the output layer as a parameter.

3. The anomaly detection apparatus as claimed in claim 1, wherein the processing circuitry learns parameters in the autoencoder by using parameters, as initial values, obtained by individually executing learning for each data type.

4. The anomaly detection apparatus as claimed in claim 1, wherein the anomaly degree calculation unit calculates an anomaly degree of the test data as a weighted average of reconstruction error for each data type, by using a weight for each data type.

5. The anomaly detection apparatus as claimed in claim 1, wherein the processing circuitry performs learning of parameters so that a weighted average of reconstruction error for each data type is minimized using a weight for each data type.

6. An anomaly detection method detected by an anomaly detection apparatus having a function of an autoencoder that includes an input layer, hidden layers, and an output layer, and that learns parameters such that data of the input layer is reproduced in the output layer, the anomaly detection method comprising:
an input step of inputting normal data of a plurality of types;
a learning step of leaning parameters such that normal data of the input layer is reproduced in the output layer by learning a feature across the data types using data of a dimension which is smaller than a dimension of the normal data; and
an anomaly degree calculation step of inputting test data to the autoencoder using the parameters learned by the learning step, and calculating an anomaly degree of the test data based on output data of the autoencoder and the test data,
wherein the autoencoder includes
an input layer,
multiple layers as the hidden layers, and
an output layer,
wherein the method includes extracting, in multiple hidden layers, a feature for each data type with a dimension smaller than a dimension of the normal data which is included in the input layer, and extracts, in one hidden layer, a feature across the data types such that,
the input layer includes separate pieces of the input normal data, having a first dimension size, for each of the plurality of types of data,
a second layer among the hidden layers that includes separate pieces of data, respectively for each of the plurality of types of data in the first layer, that are generated to have a second dimension size that is smaller than the first dimension size based on a first mapping function, and
a third layer among the hidden layers that includes a single piece of data having the second dimension size and being generated from the feature across the data types of all of the separate pieces of data in the second layer based on a second mapping function,
wherein the first mapping function and the second mapping function are based on the learned parameters.

7. A non-transitory computer readable recording medium storing a program for causing a computer to function as the anomaly detection apparatus as claimed in claim 1.

* * * * *